United States Patent [19]

Peytavy et al.

[11] Patent Number: 5,277,885

[45] Date of Patent: Jan. 11, 1994

[54] LIQUID ABSORBING ACIDIC GASES AND USE THEREOF IN DEACIDIFICATION OF GASES

[75] Inventors: Jean-Louis Peytavy, Lotissement; Philippe Le Coz, Poey de Lescar; Olivier Oliveau, Allée des Prés, all of France

[73] Assignee: Elf Aquitaine Production, Paris, France

[21] Appl. No.: 58,570

[22] Filed: May 6, 1993

Related U.S. Application Data

[60] Division of Ser. No. 460,958, Jan. 18, 1990, Pat. No. 5,209,914, and a continuation-in-part of Ser. No. 917,758, Jul. 21, 1992.

[30] Foreign Application Priority Data

May 24, 1989 [FR] France ............... 88 06880
May 24, 1989 [FR] France ............... 88 06881
Dec. 8, 1989 [FR] France ............... 88 16130

[51] Int. Cl.$^5$ .................. C01B 3/20; C09K 3/00
[52] U.S. Cl. .................. 423/228; 252/189; 423/229
[58] Field of Search ............ 423/228, 229; 252/189

[56] References Cited

U.S. PATENT DOCUMENTS 4,376,102  3/1983  Thaler et al. .................. 423/228

Primary Examiner—Wayne Langel
Attorney, Agent, or Firm—Weiser & Associates

[57] ABSTRACT

Liquid absorbing acid gas compounds presenting an improved $CO_2$ absorption capacity, said absorbing liquid containing one or a plurality of tertiary alkanolamines and a $CO_2$ absorption activator. The activator is comprised of at least one amino compound selected among polyalkylene-polyamines, alkylenediamines or cycloalkylenediamines, the aminoalkylated compounds of heterocycles such as piperazine, piperidine, furan, thiophene, tetrahydrofuran and tetrahydrothiophene, the alkoxyalkylamines and the alkylmono-alkanolamines having an alkyl residue in at least $C_2$. Application of said absorbent liquid to the deacidification of gases containing $CO_2$ and optionally other acid gas compounds, particularly $H_2S$ and/or COS.

24 Claims, No Drawings

LIQUID ABSORBING ACIDIC GASES AND USE THEREOF IN DEACIDIFICATION OF GASES

This patent application is a divisional application of allowed application Ser. No. 07/460,958, filed Jan. 18, 1990, for LIQUID ABSORBING ACIDIC GASES AND USE THEREOF IN DEACIDIFICATION OF GASES, now U.S. Letters Pat. No. 5,209,914, and a continuation-in-part application of copending application Ser. No. 07/917,758, filed Jul. 21, 1992, for LIQUID ABSORBENT FOR ACIDIC GASES AND PROCESS OF DEACIDIFICATION OF A GAS, which are both incorporated herein by reference.

The invention relates to a liquid absorbing acidic gases containing a tertiary alkanolamine component and an activator of $CO_2$ absorption. It also relates to the application of the said absorbent liquid to the deacidification of gases containing $CO_2$ and possibly other acidic gaseous compounds such as $H_2S$ or/and COS.

It is known that it is possible to rid gases of undesirable acidic gaseous compounds or acidic gases, especially $CO_2$, $H_2S$ and COS, which they contain by subjecting the said gases to scrubbing by means of regenerable absorbent liquids consisting of organic solvents or of aqueous solutions of organic solvents, which retain the acidic gaseous compounds. On an industrial scale, there are chiefly two categories of absorbent liquids employed for scrubbing gas containing acidic gaseous compounds, namely, on the one hand, absorbent liquids with physical action, such as sulpholane, N-methylpyrrolidone, polyethylene glycol dimethyl ether, methanol or else propylene carbonate, which absorb acidic gaseous compounds such as mentioned above without any chemical reaction, but whose major disadvantage is that of simultaneously absorbing large quantities of hydrocarbons and, on the other hand, absorbent liquids with predominant chemical action and especially aqueous solutions of alkanolamines such as monoethanolamine, diethanolamine, diglycolamine, diisopropanolamine, triethanolamine or else methyldiethanolamine, which fix acidic gaseous compounds such as $CO_2$, $H_2S$ and COS by chemical reaction with formation of compounds capable of being decomposed by heating, which allows the absorbent liquid to be regenerated. Primary alkanolamines such as monoethanolamine, or secondary alkanolamines such as diethanolamine, are generally suitable for highly exhaustive removal of $CO_2$, but exhibit the disadvantage of requiring a large expenditure of energy for their regeneration.

With tertiary alkanolamines, especially methyldiethanolamine and triethanolamine, the consumption of energy needed for the regeneration is lower, but the treated gas resulting from the scrubbing operation using the said tertiary alkanolamines still has $CO_2$ contents ranging from a few thousand ppm to a few per cent, depending on the case. This is due to the fact that tertiary alkanolamines do not react directly with $CO_2$, the result being kinetics of absorption of $CO_2$ by the absorbent liquid containing such tertiary alkanolamines which are much slower than the kinetics of absorption of $CO_2$ by an absorbent liquid based on primary or secondary alkanolamines, while the rate of absorption of $H_2S$ is substantially the same whatever the alkanolamine employed in the absorbent liquid.

In order to draw maximum advantage of the saving of regeneration energy which can be achieved when an absorbent liquid based on a tertiary alkanolamine is employed for scrubbing gases containing acidic gaseous impurities such as $CO_2$, $H_2S$ and COS, while obtaining a suitable removal of $CO_2$, it has been proposed to add to the said absorbent liquid a small quantity of an activator which accelerates $CO_2$ absorption without modifying the absorption capacity for other acidic gaseous compounds and especially for $H_2S$, or the energy saving achieved during the regeneration of the absorbent liquid.

Among the products proposed hitherto as activators of $CO_2$ absorption by absorbent liquids based on tertiary alkanolamines are to be found primary alkanolamines such as monoethanolamine (EP-A-0,160,203), monomethylmonoethanolamine (U.S. Pat. No. 3,622,267) and piperazine (U.S. Pat. No. 4,336,233).

It has now been found that certain other amine compounds have been shown to be effective activators of $CO_2$ absorption by tertiary alkanolamines.

The invention proposes, therefore, a liquid absorbing acidic gaseous compounds exhibiting an improved absorption capacity for $CO_2$, the said absorbent liquid containing a tertiary alkanolamine component made up of one or more tertiary alkanolamines and an activator of $CO_2$ absorption by the said tertiary alkanolamine component and characterized in that the said activator consists of at least one amino compound corresponding to one of the following formulae (I)

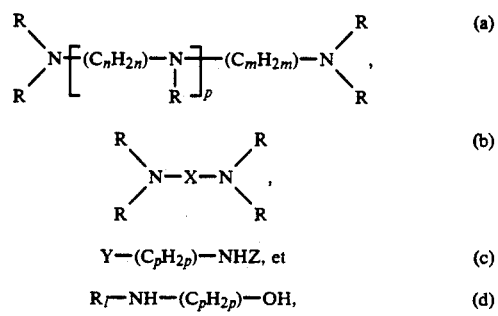

$$Y-(C_pH_{2p})-NHZ, \text{ et} \quad (c)$$

$$R_I-NH-(C_pH_{2p})-OH, \quad (d)$$

with, in these formulae, X denoting a divalent radical chosen from $C_2$-$C_9$ alkylene radicals and $C_4$-$C_9$ cycloalkylene radicals, the symbols R each denote independently a hydrogen atom or a $C_1$-$C_6$ monovalent hydrocarbyl radical, optionally substituted by a functional group and, for example, by a hydroxyl group, with at least one of the symbols R consisting of a hydrogen atom, Y denoting a monovalent radical chosen from the group formed by the piperazyl, piperidinyl, furyl, tetrahydrofuryl, thienyl, tetrahydrothienyl and —$OR_2$ radicals, Z denoting an —$R_2$ radical or a hydrogen atom, $R_1$ denoting a $C_2$-$C_6$ monovalent hydrocarbon radical, $R_2$ being a hydrocarbon monovalent residue, optionally substituted by a functional group and, for example, by a hydroxyl group, m and n, which are identical or different, being integers taking the values of 2 to 6 and preferably the values 2 or 3 and, p an integer ranging from 1 to 6.

When they do not denote hydrogen atoms, the symbols R appearing in the formulae (a) and (b) of the activators are in particular $C_1$-$C_6$ alkyl or hydroxyalkyl radicals or phenyl radicals.

The amino compounds of formula (a) which may be chosen for forming the activator according to the invention are advantageously those in the case of which the symbols R in the formula which represents them are hydrogen atoms.

The preferred amino compounds of this type are the polyamines represented by the following formula (e)

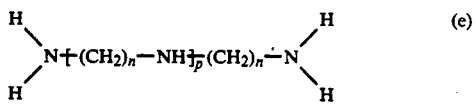

in which n is an integer ranging from 2 to 6 and preferably equal to 2 or 3 and p is an integer ranging from 1 to 6 and preferably from 1 to 4.

Examples of such polyamines which may be especially mentioned are dipropylenetriamine (abbreviated to DPTA) of formula $H_2N-(CH_2)_3-NH-(CH_2)_3-NH_2$, diethylenetriamine (abbreviated to DETA) of formula $H_2N-(CH_2)_2-NH-(CH_2)_2-NH_2$, triethylenetetramine (abbreviated to TETA) of formula $H_2N+(CH_2)_2NH+_2(CH_2)_2NH_2$ and tetraethylenepentamine (abbreviated to TEPA) corresponding to the formula $H_2N+(CH_2)_2NH+_3(CH_2)_2NH_2$.

Advantageously, the amino compounds of formula (b) which may be chosen to form the activator according to the invention are those in which, in the said formula (b), the radical X is a $C_2-C_6$ alkylene radical or a cyclohexylene radical and each of the symbols R denotes a hydrogen atom or a $C_1-C_6$ and preferably $C_1-C_4$ alkyl or hydroxyalkyl radical, provided that at least one of the symbols R is a hydrogen atom.

By way of examples of such amino compounds of formula (b), there may be mentioned especially aminoethylethanolamine (abbreviated to AEEA) of formula $H_2N-(CH_2)_2-NH-(CH_2)_2OH$, hexamethylenediamine (abbreviated to HMDA) of formula $H_2N-(CH_2)_6-NH_2$, dimethylaminopropylamine (abbreviated to DMAPA) of formula

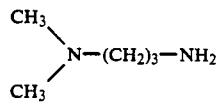

and 1,2-diaminocyclohexane (abbreviated to DACH) of formula

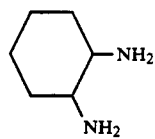

The amino compounds of formula (c) or (d) which may be employed as activators according to the invention correspond in particular to the formulae $Y_1-(CH_2)_q-NH_2$ and $R_3-NH-(CH_2)_q-OH$, in which $Y_1$ is a monovalent radical chosen from the radicals

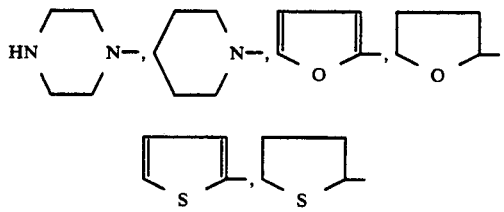

and $C_1-C_6$ alkoxy radicals, $R_3$ is a $C_2-C_6$ alkyl radical, and q is an integer taking the values of 1 to 6.

Examples of such amino compounds are such as methoxypropylamine (abbreviated to MOPA), ethoxypropylamine, aminoethylpiperazine (abbreviated to AEPZ), aminopropylpiperazine, aminoethylpiperidine (abbreviated to AEPD), aminopropylpiperidine, furfurylamine (abbreviated to FA) and ethylmonoethanolamine (abbreviated to EMEA).

The absorbent liquid according to the invention is generally in the form of an aqueous solution of the tertiary alkanolamine component and of the activator. Where appropriate, the said aqueous solution may also contain a minor quantity of one or more water-soluble organic solvents for the acidic gases, especially sulpholane, methanol or N-methylpyrrolidone.

The concentration of the tertiary alkanolamine component in the aqueous absorbent liquid may be between 1N and 6N and preferably lies between 2.5N and 5N.

The quantity of activator which is associated with the tertiary alkanolamine component in the absorbent liquid according to the invention can vary quite widely. The said quantity is advantageously such that the ratio of the number of moles of activator to the total number of moles of activator and of tertiary alkanolamine component is between 0.01 and 0.5 and preferably from 0.05 to 0.25.

The tertiary alkanolamines which can be employed for forming the tertiary alkanolamine component of the absorbent liquid may be chosen from the various tertiary alkanolamines which are soluble in water in the concentrations employed. Examples of these tertiary alkanolamines are such as N-methyldiethanolamine, triethanolamine, N-ethyldiethanolamine, 2-diemethylaminoethanol, 2-dimethylamino-1-propanol, 3-dimethylamino-1-propanol, 1-dimethylamino-2-propanol, N-methyl-N-ethylethanolamine, 2-diethylaminoethanol, 3-dimethylamino-1-butanol, 3-dimethylamino-2-butanol, N-methyl-N-isopropylethanolamine, N-methyl-N-ethyl-3-amino-1-propanol, 4-diemethylamino-1-butanol, 4-dimethylamino-2-butanol, 3-dimethylamino-2-methyl-1-propanol, 1-dimethylamino-2-methyl-2-propanol, 2-dimethylamino-1-butanol and 2-dimethylamino-2-methyl-1-propanol. The preferred tertiary alkanolamines include methyldiethanolamine, triethanolamine, 2-dimethylaminoethanol, 3-dimethylamino-1-propanol and 1-diethylamino-2-propanol.

The absorbent liquid according to the invention can be employed for performing the scrubbing of various gases containing $CO_2$ and possibly other acidic gaseous compounds such as $H_2S$ and COS with a view to carrying out a deacidification of these gases, that is to say a removal of the acidic gaseous compounds which they contain.

The gases to be treated containing $CO_2$ and possibly one or more other acidic gaseous compounds such as $H_2S$ and COS may be synthesis gases, gases originating from coal gasification, coke oven gases, refinery gases or else natural gases, and their total content of acidic gaseous compounds may range from a few tenths of a percent to some tens of percent by volume.

The implementation of the scrubbing of the gas containing $CO_2$ and possibly the other acidic gaseous compounds to be removed, such as $H_2S$ and COS, generally comprises an absorption stage during which the gas to be treated and the absorbent liquid are brought into contact, preferably countercurrentwise, in an absorption zone to produce a treated gas with a reduced content of acidic gaseous compounds, the said content generally corresponding to that of the specifications imposed on the treated gas, and an absorbent liquid charged with $CO_2$ and other possible acidic gaseous compounds, and a regeneration stage, during which the said charged absorbent liquid is subjected to a regeneration treatment to release the acidic gaseous compounds retained by the absorbent liquid and to produce, on the one hand, at least one acidic gaseous fraction containing the said released acidic gaseous compounds and, on the other hand, at least one regenerated absorbent liquid which is recycled towards the absorption zone.

The regeneration of the absorbent liquid charged with $CO_2$ and with other possible acidic gaseous compounds, especially $H_2S$ or/and COS, is advantageously carried out by decompression, in one or more stages, of at least a part of the said charged absorbent liquid, which is reflected in a substantial saving in the energy to be employed for this regeneration.

According to one embodiment of the regeneration, all of the charged absorbent liquid is decompressed in one or more stages to release most of the $CO_2$ present in the said charged absorbent liquid, and the decompressed absorbent liquid is then subjected to a complementary regeneration by steam stripping, by direct or indirect heating of the absorbent liquid, the absorbent liquid resulting from the complementary regeneration being recycled into the absorption zone and especially into the upper part of the said zone. In an alternative form of this embodiment, only a part of the decompressed absorbent liquid is subjected to the complementary regeneration by stripping, the absorbent liquid resulting from the said complementary regeneration being, as indicated earlier, recycled into the upper part of the absorption zone, while the part of the decompressed absorbent liquid which is not subjected to the complementary regeneration is recycled into the absorption zone, at a point of the latter which is situated below the point of recycling of the absorbent liquid regenerated by stripping.

According to another embodiment of the regeneration, a fraction of the charged absorbent liquid is decompressed to release most of the $CO_2$ which it contains, while the remaining fraction of the charged absorbent liquid is subjected directly to a regeneration by steam stripping, by direct or indirect heating of the said remaining fraction, the fraction of the absorbent liquid regenerated by stripping being recycled into the upper part of the absorption zone, while the decompressed fraction of absorbent liquid is recycled into the absorption zone below the point of recycling of the absorbent liquid regenerated by stripping.

If need be, the charged absorbent liquid leaving the absorption zone may be subjected to a preliminary decompression to release nonacidic gases such as the hydrocarbons retained by the absorbent liquid, before the actual regeneration is carried out.

The absorption and regeneration stages outlined above can be implemented in any device which makes it possible to carry out the deacidification of a gas by means of a regenerable absorbent liquid and in particular in those of the said devices which make it possible to perform an at least partial regeneration of the charged absorbent liquid by decompression and possibly to supplement this regeneration by a regeneration using stripping. Devices similar to those which are shown diagrammatically in the citations U.S. Pat. No. 3,622,267 and U.S. Pat. No. 4,336,233 are particularly suitable.

The operating conditions for implementing the abovementioned absorption and regeneration stages, especially temperature, pressure, gas flow rate and the flow rate of absorbent liquid, are those recommended for the gas deacidification processes employing absorbent liquids based on alkanolamines. For example, the absorption stage during which the gas to be treated, which contains $CO_2$ and possibly one or more acidic gaseous compounds such as $H_2S$ and COS, is scrubbed using the absorbent liquid, can be implemented at temperatures of between 10° C. and 100° C. and more particularly between 30° C. and 60° C. and at pressures of between 1.5 and 100 bars absolute. Regeneration by decompression is also carried out at the temperature at which the charged absorbent liquid to be decompressed is present, the pressures reached after each decompression being between the pressure of the charged absorbent liquid drawn off from the absorption zone and approximately 1.5 bars absolute and decreasing from one decompression to the next when several successive decompressions are performed. Regeneration by stripping is carried out in a conventional manner by subjecting the absorbent liquid to a reboiling operation in a stripping zone maintained overhead at a temperature of approximately between 80° C. and 150° C. and at a pressure below 5 bars and in most cases between 1.3 and 2.5 bars absolute.

When the regeneration by decompression, in one or more stages, is followed by a complementary regeneration by stripping, the pressure of the decompressed absorbent liquid conveyed to the regeneration by stripping is chosen so as to be close to the overhead pressure of the stripping zone.

The invention is illustrated by the following examples, given without any limitation being implied.

EXAMPLE 1

Three series of tests were carried out, of $CO_2$ absorption using absorbent liquids according to the invention, consisting of aqueous solutions of methyldiethanolamine (abbreviated to MDEA) and of an activator of the polyamine type of formula (a) or, by way of comparison, using known absorbent liquids consisting of aqueous solutions of MDEA free from activator.

In each test a gas containing $CO_2$ was scrubbed using the chosen absorbent liquid by operating in a column equipped overhead with an exit for the gases, in its upper part with an entry for the liquids, in its lower part with an entry for the gases and at the bottom with an exit for the liquids, the internal space of the column included between the said entries for the liquids and for the gases being provided with 12 uniformly spaced perforated trays.

A gas containing 40% of $CO_2$ and 60% of methane by volume was injected at a flow rate of 600 Nl/h via the gas entry of the column, and the chosen absorbent liquid was introduced at a flow rate of 3 l/h via the liquid entry of the said column. A $CO_2$-depleted gas was discharged from the head of the column and an absorbent liquid charged with $CO_2$ was drawn off at the bottom of the said column.

The values of the absolute pressure and of the overhead temperature of the column were 2.2 bars and 50° C. respectively.

The gases entering and leaving the column were analysed by gas phase chromatography to determine their $CO_2$ content, and the quantity of $CO_2$ absorbed by the absorbent liquid was deduced from these measurements.

The efficiency of the absorption of $CO_2$ by the absorbent liquid containing an activator was defined as a quantity called "relative $CO_2$ absorption", which represents the ratio of the molar percentage of $CO_2$ absorbed by the MDEA solution containing an activator to the molar percentage of $CO_2$ absorbed by the MDEA solution without activator.

The operating conditions specific to each of the tests and the results obtained are collated in Table I below.

Inspection of the results which appear in the said Table shows that the absorbent liquids according to the invention with MDEA base and an activator of formula (a) exhibit an improved capacity for $CO_2$ absorption compared with absorbent liquids containing the same tertiary alkanolamine, but without activator, this improvement in the efficiency of $CO_2$ absorption being maintained and even increased when the absorbent liquids according to the invention contain a certain residual quantity of $CO_2$.

TABLE I

| Composition of the aqueous absorbent liquid | | | | |
|---|---|---|---|---|
| | Activator | | | |
| MDEA (moles/l) | Nature | Concentration (moles/l) | Residual $CO_2$ (g/l) | Relative $CO_2$ absorption |
| 4 | — | — | | 1 |
| 3.5 | DPTA | 0.5 | | 2.1 |
| 3.5 | TETA | 0.5 | | 2.2 |
| 3.5 | TEPA | 0.5 | | 2.3 |
| 3.5 | DETA | 0.5 | | 2.3 |
| 4 | — | — | 20 | 1 |
| 3.5 | DPTA | 0.5 | 20 | 2.2 |
| 3.5 | TETA | 0.5 | 20 | 2.2 |
| 3.5 | TEPA | 0.5 | 20 | 2.4 |
| 3.5 | DETA | 0.5 | 20 | 2.4 |
| 4 | — | — | 40 | 1 |
| 3.5 | DPTA | 0.5 | 40 | 2.5 |
| 3.5 | TETA | 0.5 | 40 | 2.4 |
| 3.5 | TEPA | 0.5 | 40 | 2.7 |
| 3.5 | DETA | 0.5 | 40 | 2.7 |

EXAMPLE 2

Three series of tests were carried out, of $CO_2$ by absorbent liquids according to the invention, consisting of aqueous solutions of methyl diethanolamine (abbreviated to MDEA) and of an activator of the diamine type of formula (b) or, by way of comparison, by absorbent liquids consisting of aqueous solutions of MDEA free from activator.

In each test a gas containing $CO_2$ was scrubbed by means of the chosen absorbent liquid by operating in a column similar to that described in Example 1, the internal space of the column included between the liquid entry and the gas entry being provided with 15 uniformly spaced perforated trays.

A gas containing, by volume, 40% of $CO_2$ and 60% of methane was injected at a flow rate of 440 Nl/h through the gas entry of the column, and the chosen absorbent liquid was introduced at a flow rate of 3 l/h through the liquid entry of the said column. A $CO_2$-depleted gas was discharged overhead from the column and an absorbent liquid charged with $CO_2$ was drawn off at the bottom of the said column.

The absolute pressure and the temperature at the head of the column had values equal to 2.2 bars and 40° C. respectively.

The gases entering and leaving the column were analysed by gas phase chromatography to determine their $CO_2$ content and the quantity of $CO_2$ absorbed by the absorbent liquid was deduced from these measurements.

The operating conditions specific to each of the tests and the results obtained are collated in Table II.

Inspection of the results which appear in Table II shows that the absorbent liquids according to the invention based on MDEA and on an activator of formula (b) exhibit an improved capacity for absorbing $CO_2$ by comparison with the absorbent liquids containing the same tertiary alkanolamine but free from activator, this improved absorption capacity being substantially maintained when the absorbent liquids according to the invention contain a certain residual quantity of $CO_2$.

TABLE II

| Composition of the aqueous absorbent liquid | | | | |
|---|---|---|---|---|
| | Activator | | | |
| MDEA (moles/l) | Nature | Concentration (moles/l) | Residual $CO_2$ (g/l) | Relative $CO_2$ absorption |
| 4 | — | — | | 1 |
| 3.5 | AEEA | 0.5 | | 1.8 |
| 3.5 | HMDA | 0.5 | | 1.7 |
| 4 | — | — | 22 | 1 |
| 3.5 | AEEA | 0.5 | 22 | 1.7 |
| 3.5 | HMDA | 0.5 | 22 | 1.5 |
| 4 | — | — | 42 | 1 |
| 3.5 | AEEA | 0.5 | 42 | 1.65 |
| 3.5 | HMDA | 0.5 | 42 | 1.45 |

EXAMPLE 3

Three series of tests were carried out, of $CO_2$ absorption by absorbent liquids according to the invention consisting of aqueous solutions of MDEA and of an activator of the diamine type of formula (b) or, by way of comparison, by absorbent liquids consisting of aqueous solutions of MDEA free from activator.

In each test, a gas containing $CO_2$ was scrubbed by means of the chosen absorbent liquid by operating in a column similar to that employed in Example 1, but equipped with 6 perforated trays.

A gas containing, by volume, 40% of $CO_2$ and 60% of methane was injected at a flow rate of 600 Nl/h through the gas entry of the column, and the chosen absorbent liquid was introduced at a flow rate of 3 l/h through the liquid entry of the said column. A $CO_2$-depleted gas was discharged at the head of the column and an absorbent liquid charged with $CO_2$ was drawn off at the bottom of the said column.

The absolute pressure and the temperature at the head of the column were equal to 2.2 bars and 50° C. respectively. The gases leaving and entering the column were analysed by gas phase chromatography to determine their $CO_2$ content and the quantity of $CO_2$ absorbed by the absorbent liquid was deduced from these measurements.

The operating conditions specified to each of the tests and the results obtained are presented in Table III.

TABLE III

| Composition of the aqueous absorbent liquid | | | | |
|---|---|---|---|---|
| | Activator | | | |
| MDEA (moles/l) | Nature | Concentration (moles/l) | Residual $CO_2$ (g/l) | Relative $CO_2$ absorption |
| 4 | — | — | | 1 |

TABLE III-continued

| | Composition of the aqueous absorbent liquid | | | |
|---|---|---|---|---|
| | Activator | | | |
| MDEA (moles/l) | Nature | Concentration (moles/l) | Residual $CO_2$ (g/l) | Relative $CO_2$ absorption |
| 3.5 | DMAPA | 0.5 | | 2 |
| 3.5 | DACH | 0.5 | | 2.1 |
| 4 | — | — | 15 | 1 |
| 3.5 | DMAPA | 0.5 | 15 | 1.9 |
| 3.5 | DACH | 0.5 | 15 | 2.1 |
| 4 | — | — | 30 | 1 |
| 3.5 | DMAPA | 0.5 | 30 | 1.9 |
| 3.5 | DACH | 0.5 | 30 | 2 |

Inspection of the results in Table III shows again the improved capacity for absorbing $CO_2$ exhibited by the absorbent liquids according to the invention based on MDEA and on an activator of formula (b) by comparison with the control absorbent liquids containing the same tertiary alkanolamine but free from activator. In addition, this improved $CO_2$ absorption capacity is substantially maintained when the absorbent liquids according to the invention contain a certain residual quantity of $CO_2$.

EXAMPLE 4

Three series of tests were carried out, of $CO_2$ absorption by absorbent liquids according to the invention, consisting of aqueous solutions of methyl diethanolamine (abbreviated to MDEA) and of an activator, namely EMEA (formula (d)) or FA (formula (c)), or, by way of comparison, by absorbent liquids consisting of aqueous solutions of MDEA free from activator.

In each test a gas containing $CO_2$ was scrubbed by means of the chosen absorbent liquid by operating in a column similar to that employed in Example 1, but containing 9 uniformly spaced perforated trays.

A gas containing, by volume, 40% of $CO_2$ and 60% of methane was injected, at a flow rate of 440 Nl/h through the gas entry of the column, and the chosen absorbent liquid was introduced at a flow rate of 3 l/h through the liquid entry of the said column. A $CO_2$-depleted gas was discharged at the head of the column and an absorbent liquid charged with $CO_2$ was drawn off at the bottom of the said column.

The absolute pressure and the temperature at the head of the column had values equal to 2.2 bars and 40° C. respectively.

The gases entering and leaving the column were analysed by gas phase chromatography to determine their $CO_2$ content and the quantity of $CO_2$ absorbed by the absorbent liquid was deduced from these measurements.

The operating conditions specific to each of the tests and the results obtained are collated in Table IV.

Inspection of the results which appear in Table IV shows that the absorbent liquids according to the invention based on MDEA and on an activator of formula (c) or (d) exhibit an improved capacity for absorbing $CO_2$ by comparison with the absorbent liquids containing the same tertiary alkanolamine, but free from activator, this improved absorption capacity being substantially maintained when the absorbent liquids according to the invention contain a certain residual quantity of $CO_2$.

TABLE IV

| | Composition of the aqueous absorbent liquid | | | |
|---|---|---|---|---|
| | Activator | | | |
| MDEA (moles/l) | Nature | Concentration (moles/l) | Residual $CO_2$ (g/l) | Relative $CO_2$ absorption |
| 4 | — | — | | 1 |
| 3.5 | EMEA | 0.5 | | 1.95 |
| 3.5 | FA | 0.5 | | 1.85 |
| 4 | — | — | 20 | 1 |
| 3.5 | EMEA | 0.5 | 20 | 1.90 |
| 3.5 | FA | 0.5 | 20 | 1.75 |
| 4 | — | — | 40 | 1 |
| 3.5 | EMEA | 0.5 | 40 | 1.85 |
| 3.5 | FA | 0.5 | 40 | 1.70 |

EXAMPLE 5

Three series of tests were carried out, of $CO_2$ absorption by absorbent liquids according to the invention, consisting of aqueous solutions of MDEA and of an activator of formula (c) or, by way of comparison, by absorbent liquids consisting of aqueous solutions of MDEA free from activator.

In each test a gas containing $CO_2$ was scrubbed by means of the chosen absorbent liquid by operating in a column similar to that employed in Example 1, but equipped with 6 perforated trays.

A gas containing, by volume, 40% of $CO_2$ and 60% of methane was injected, at a flow rate of 600 Nl/h, through the gas entry of the column, and the chosen absorbent liquid was introduced at a flow rate of 3 l/h through the liquid entry of the said column. A $CO_2$-depleted gas was discharged at the head of the column and an absorbent liquid charged with $CO_2$ was drawn off at the bottom of the said column.

The absolute pressure and the temperature at the head of the column were equal to 2.2 bars and 50° C. respectively.

The gases entering and leaving the column were analysed by gas phase chromatography to determine their $CO_2$ content and the quantity of $CO_2$ absorbed by the absorbent liquid was deduced from these measurements.

The operating conditions specific to each of the tests and the results obtained are shown in table V.

TABLE V

| | Composition of the aqueous absorbent liquid | | | |
|---|---|---|---|---|
| | Activator | | | |
| MDEA (moles/l) | Nature | Concentration (moles/l) | Residual $CO_2$ (g/l) | Relative $CO_2$ absorption |
| 4 | — | — | | 1 |
| 3.5 | MOPA | 0.5 | | 1.95 |
| 3.5 | AEPD | 0.5 | | 1.9 |
| 4 | — | — | 22 | 1 |
| 3.5 | MPOA | 0.5 | 22 | 1.85 |
| 3.5 | AEPD | 0.5 | 22 | 1.8 |
| 4 | — | — | 42 | 1 |
| 3.5 | MOPA | 0.5 | 42 | 1.8 |
| 3.5 | AEPD | 0.5 | 42 | 1.7 |

Inspection of the results which appear in Table V again shows the improved capacity for absorbing $CO_2$ exhibited by the absorbent liquids according to the invention based on MDEA and on an activator of formula (c) when compared with that possessed by the control absorbent liquids containing the same tertiary alkanolamine but free from activator. In addition, it appears that this improved absorption capacity for $CO_2$ is substantially maintained when the absorbent liquids according to the invention contain a certain residual quantity of $CO_2$.

EXAMPLE 6

Three series of tests were carried out, of $CO_2$ absorption by absorbent liquids according to the invention, consisting of aqueous solutions of MDEA and of an activator consisting of aminoethylpiperazine (compound of formula (c)) or, by way of comparison, by absorbent liquids consisting of aqueous solutions of MDEA, free from activator.

In each test a gas containing $CO_2$ was scrubbed by means of the chosen absorbent liquid by operating in a column similar to that employed in Example 1, but equipped with 12 perforated trays.

A gas containing, by volume, 40% of $CO_2$ and 60% of methane was injected, at a flow rate of 440 Nl/h, through the gas entry of the column, and the chosen absorbent liquid was introduced at a flow rate of 3 l/h through the liquid entry of the said column. A $CO_2$-depleted gas was discharged at the head of the column and an absorbent liquid charged with $CO_2$ was drawn off at the bottom of the said column.

The absolute pressure and the temperature at the head of the column were equal to 2.2 bars and 40° C. respectively. The gases entering and leaving the column were analysed by gas phase chromatography to determine their $CO_2$ content and the quantity of $CO_2$ absorbed by the absorbent liquid was deduced from these measurements.

The operating conditions specific to each of the tests and the results obtained are shown in Table VI.

TABLE VI

| Composition of the aqueous absorbent liquid | | | | |
|---|---|---|---|---|
| MDEA (moles/l) | Activator | | Residual $CO_2$ (g/l) | Relative $CO_2$ absorption |
| | Nature | Concentration (moles/l) | | |
| 4 | — | — | — | 1 |
| 3.5 | AEPZ | 0.5 | — | 2.2 |
| 4 | — | — | 15 | 1 |
| 3.5 | AEPZ | 0.5 | 15 | 2.1 |
| 4 | — | — | 30 | 1 |
| 3.5 | AEPZ | 0.5 | 30 | 2.1 |

Inspection of the results which appear in Table VI again shows the improved capacity for absorbing $CO_2$ exhibited by the absorbent liquids according to the invention based on MDEA and on an activator of formula (c) when compared with that possessed by the control absorbent liquids containing the same tertiary alkanolamine but free from activator. In addition, it appears that this improved absorption capacity for $CO_2$ is substantially maintained when the absorbent liquids according to the invention contain a certain residual quantity of $CO_2$.

We claim:

1. A process for improved $CO_2$ absorption from a gas by an absorbent liquid which has an improved absorption capacity for $CO_2$ which process comprises contacting said gas and the absorbent liquid in an absorption zone having an upper and lower part, thereby obtaining a treated gas with a reduced content of $CO_2$ and the absorbent liquid with increased $CO_2$ content, and regenerating the absorbent liquid which has an increased $CO_2$ content, thereby releasing the $CO_2$ and producing at least one gaseous fraction containing the released $CO_2$ and at least one portion of the regenerated absorbent liquid and recycling said generated absorbent liquid to the absorption zone, the absorbent liquid being a mixture of one or more tertiary alkanolamines and an activator of improved $CO_2$ absorption by said tertiary alkanolamines, the activator having the general formula

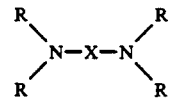

wherein X is a divalent radical chosen from $C_2$-$C_9$ alkylene and $C_4$-$C_9$ cycloalkylene radicals, the symbols R each being independently, a hydrogen atom or a $C_1$-$C_6$ monovalent hydrocarbyl radical.

2. The process of claim 1 wherein in the formula X is $C_2$-$C_6$ alkylene or cyclohexylene.

3. The process of claim 1 in which each one of R is hydrogen or when at least one of the R is hydrogen, the other Rs are alkyl of $C_1$-$C_4$ or hydroxyalkyl.

4. The process of claim 1 wherein the $C_1$-$C_6$ radical is substituted by a functional group.

5. The process of claim 4 wherein the functional group is hydroxyl or phenyl.

6. The process of claim 1 wherein the activator is present in an activating amount.

7. The process of claim 1 wherein the gas is subjected to a treatment comprising an absorption stage and a regeneration stage during which the charged absorbent liquid is subjected to a regeneration treatment to release the $CO_2$ which it has retained and to produce, on the one hand, at least one acidic gaseous fraction containing the released $CO_2$ and, on the other hand, at least one regenerated absorbent liquid which is recycled towards the absorption zone.

8. The process of claim 7 wherein the regeneration is carried out by decompression in one or more stages of at least one part of the charged absorbent liquid.

9. The process of claim 1 wherein the regeneration of the charged absorbent liquid is carried out by subjecting all of the charged absorbent liquid to decompression in one or more stages to release most of the $CO_2$ present in the said charged absorbent liquid, then subjecting the decompressed absorbent liquid to a complementary regeneration by steam-stripping by direct or indirect heating of the absorbent liquid, the absorbent liquid resulting from the complementary regeneration being recycled into the absorption zone.

10. The process of claim 1 wherein a part of the decompressed absorbent liquid is subjected to a complementary regeneration by stripping, the absorbent liquid resulting from the complementary regeneration being recycled into the upper part of the absorption zone while the part of the decompressed absorbent liquid which is not subjected to the complementary regeneration is being recycled into the absorption zone below the absorbent liquid regenerated by stripping.

11. The process of claim 1 wherein the regeneration of the charged absorbent liquid is carried out by subjecting a fraction of the charged absorbent liquid to decompression in one or more stages to release most of the $CO_2$ which it contains while the remaining fraction of the charged absorbent liquid is subjected directly to a regeneration by steam-stripping by direct or indirect heating of the absorbent liquid of the remaining fraction, the fraction of the absorbent liquid regenerated by stripping is being recycled into the upper part of the absorption zone while the decompressed fraction of absorbent liquid is being recycled into the absorption zone below the absorbent liquid regenerated by stripping.

12. The process of claim 1 wherein the $CO_2$-containing gas to be treated also comprises other acidic gases including $H_2S$ and/or COS.

13. The process of claim 7 wherein the decompressed absorbent liquid is subjected to a complementary regeneration step which comprises steam-stripping the absorbent liquid by direct or indirect heating.

14. An absorbent liquid for improved absorption capacity for $CO_2$ in a gas due to the presence of an activator for $CO_2$ absorption from said gas, the absorbent liquid comprising a mixture of one or more tertiary alkanolamines and the activator of improved $CO_2$ absorption by said tertiary alkanolamines, which activator has the general formula

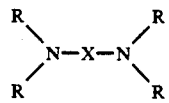

wherein X is a divalent radical chosen from $C_2$-$C_9$ alkylene and $C_4$-$C_9$ cycloalkylene radicals, the symbols R each one being independently, a hydrogen atom or a $C_1$-$C_6$ monovalent hydrocarbyl radical.

15. The absorbent liquid of claim 14 wherein when the symbols R are not hydrogen, R are alkyl $C_1$-$C_6$ or hydroxyalkyl.

16. The absorbent liquid of claim 14 wherein each one of R is hydrogen or when at least one of the R is hydrogen, the other Rs are alkyl or $C_1$-$C_4$ or hydroxyalkyl.

17. The absorbent liquid of claim 16 wherein the activator is at least one diamine selected from the group of hexamethyldiamine, 1,2-diaminocyclohexane, aminoethylethanolamine and dimethylaminopropylamine.

18. The absorbent liquid of claim 17 wherein the absorbent liquid is an aqueous solution of the tertiary alkanolamine and the activator.

19. The absorbent liquid of claim 18 wherein the absorbent liquid contains a minor quantity of at least one water-soluble organic solvent for the $CO_2$, selected from the group consisting of sulpholane, methanol and N-methylpyrrolidone.

20. The absorbent liquid of claim 18 wherein the concentration of the tertiary alkanolamine in the aqueous solution is between 1N and 6N.

21. The absorbent liquid of claim 18 wherein the quantity of activator is such that the ratio of the number of moles of activator to the total number of moles of activator and of tertiary alkanolamine is between 0.01 and 0.5.

22. The absorbent liquid of claim 18 wherein the tertiary alkanolamine is selected from the group consisting of at least one of the tertiary alkanolamines N-methyldiethanolamine, triethanolamine, 2-dimethylaminoethanol, 3-dimethylamino-1-propanol and 1-diethylamino-2-propanol.

23. The absorbent liquid of claim 18 wherein the activating amount of the activator in the absorbent liquid is between about 0.05 mole and about 2 moles per liter.

24. The absorbent liquid of claim 23 wherein the activating amount is from about 0.1 mole to about 1 mole per liter.

* * * * *